(12) United States Patent
Gerundt et al.

(10) Patent No.: US 10,483,507 B2
(45) Date of Patent: Nov. 19, 2019

(54) INSULATING OF ADJACENT LITHIUM-ION BATTERIES BY COMPLETE OVERMOULDING/POURING OF CONTAINERS IN A DEVICE

(71) Applicant: Robert Bosch GmbH, Stuttgart (DE)

(72) Inventors: Oliver Gerundt, Friolzheim (DE); Ionut Marian Lica, Schwieberdingen (DE); Thomas Klemen, Ilsfeld/Auenstein (DE); Michael Raedler, Hamburg (DE); Rene Hornung, Eisenach (DE); Markus Feigl, Markgroeningen (DE); Harald Drings, Stuttgart (DE); Seyed Mohammad Seyed Abbassi, Pforzheim (DE); Anselm Berg, Ludwigsburg (DE); Rene Deponte, Sersheim (DE); Calin Iulius Wurm, Meitingen (DE)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 15/308,958

(22) PCT Filed: Apr. 9, 2015

(86) PCT No.: PCT/EP2015/057666
§ 371 (c)(1),
(2) Date: Nov. 4, 2016

(87) PCT Pub. No.: WO2015/169526
PCT Pub. Date: Nov. 12, 2015

(65) Prior Publication Data
US 2017/0077468 A1 Mar. 16, 2017

(30) Foreign Application Priority Data

May 6, 2014 (DE) .......................... 10 2014 208 387
Apr. 8, 2015 (DE) .......................... 10 2015 206 182

(51) Int. Cl.
*H01M 10/052* (2010.01)
*H01M 2/10* (2006.01)
(Continued)

(52) U.S. Cl.
CPC ....... *H01M 2/1077* (2013.01); *H01M 2/1094* (2013.01); *H01M 10/0525* (2013.01);
(Continued)

(58) Field of Classification Search
CPC ..................... H01M 10/052; H01M 10/0525
See application file for complete search history.

(56) References Cited

U.S. PATENT DOCUMENTS 6,255,015 B1* 7/2001 Corrigan ............. H01M 2/0242
429/120
2005/0255379 A1* 11/2005 Marchio ............. H01M 2/0242
429/153
(Continued)

FOREIGN PATENT DOCUMENTS

CN 101026249 A 8/2007
CN 103367661 A 10/2013
(Continued)

OTHER PUBLICATIONS

International Search Report corresponding to PCT Application No. PCT/EP2015/057666, dated Nov. 9, 2015 (German and English language document) (9 pages).

*Primary Examiner* — Olatunji A Godo
(74) *Attorney, Agent, or Firm* — Maginot, Moore & Beck LLP

(57) ABSTRACT

A cell module for lithium-ion batteries includes at least two lithium-ion cells, in particular lithium-ion battery cells, a cell module housing that has at least one lateral wall, and at least one electrical insulation between the cells. The electrical insulation is configured in one piece with the cell module housing.

17 Claims, 2 Drawing Sheets

(51) Int. Cl.
  *H01M 10/0525* (2010.01)
  *H01M 10/42* (2006.01)
  *H01M 10/653* (2014.01)
  *H01M 10/6568* (2014.01)
  *H01M 10/613* (2014.01)

(52) U.S. Cl.
  CPC ..... *H01M 10/4257* (2013.01); *H01M 10/613* (2015.04); *H01M 10/653* (2015.04); *H01M 10/6568* (2015.04); *H01M 2010/4271* (2013.01); *Y02T 10/7011* (2013.01)

(56) References Cited

U.S. PATENT DOCUMENTS

| | | |
|---|---|---|
| 2011/0070478 A1 | 3/2011 | Meschter |
| 2012/0231311 A1 | 9/2012 | Hall |
| 2012/0315529 A1 | 12/2012 | Jin |

FOREIGN PATENT DOCUMENTS

| | | |
|---|---|---|
| CN | 103443960 A | 12/2013 |
| DE | 10 2007 010 742 A1 | 8/2008 |
| DE | 10 2012 103 149 A1 | 10/2013 |
| DE | 10 2012 205 810 A1 | 10/2013 |
| DE | 10 2012 018 048 A1 | 3/2014 |
| EP | 2 648 241 A1 | 10/2013 |
| EP | 2 650 945 A1 | 10/2013 |
| WO | 2008/050211 A1 | 5/2008 |

\* cited by examiner

INSULATING OF ADJACENT LITHIUM-ION BATTERIES BY COMPLETE OVERMOULDING/POURING OF CONTAINERS IN A DEVICE

This application is a 35 U.S.C. § 371 National Stage Application of PCT/EP2015/057666, filed on Apr. 9, 2015, which claims the benefit of priority to Serial Nos. DE 10 2014 208 387.7 filed on May 6, 2014 and DE 10 2015 206 182.5 filed on Apr. 8, 2015 in Germany, the disclosures of which are incorporated herein by reference in their entirety.

BACKGROUND

The present disclosure relates to a cell module for lithium ion batteries, and to a method for producing such a cell module.

PRIOR ART

Lithium ion accumulators which are used for the automotive field often have a prismatic shape for reasons of volume utilization. They are constructed in such a way that the interior of the housing contains a flatly pressed coil, which is rolled from an aluminum foil coated with the reactive anode and cathode materials, a likewise coated copper foil and two plastic films used as diaphragms. The accumulator housing is filled with a liquid electrolyte after introducing the coil and before pressureless closure.

The electrical contacting of the cathode and anode foils is carried out in such a way that the two foils are placed not congruently but slightly offset over one another in the direction of the coil axis. Thus, from the respective foil, the negative voltage is tapped on an open narrow side of the coil and the positive voltage is tapped from the other opposite narrow side of the coil. The contacting of the protruding foil strips is carried out with welded-on strip-shaped copper and/or aluminum sheet parts, the so-called current collectors. The contacting of so-called current collectors still inside the accumulator housing and feeding of the current paths outward through the housing are demanding. After introduction of the coil into the container and welding of the cover to the container, the latter has an approximately 5 mm large opening in order filled cover with electrolyte. As one of the last steps in the production process of the cell, this opening is closed with a closure element. In order to avoid voltage encroachment of the finished cells with respect to one another, they are insulated from one another with a plurality of layers of coating and with film.

US 2011/0070478 A1 describes a lithium ion battery, the housing of which is configured as a monobloc for a plurality of lithium ion cells. The cells are protected against moisture influences by hermetic welding or fusion of the housing.

SUMMARY

The present disclosure provides the following:
A cell module (10) for lithium ion batteries, comprising
at least two lithium ion cells (11), in particular lithium ion accumulator cells,
a cell module housing (14) comprising at least one side wall (14a), and
at least one electrical insulation (12) between the cells (11), characterized in that
the insulation is formed in one piece with the cell module housing (14).

The one-piece configuration of the insulation with the cell module housing is advantageous in several respects. Mechanical protection of the cells against external influences, such as the ingress of particles and/or water, as well as electrical insulation of the cells, is provided. By virtue of this very simple and efficient insulation of the cells from one another which is obtained, voltage encroachment of the finished cells with respect to one another is prevented. In this way, insulation of the cells with a plurality of layers of coating and film, which is usually carried out by cost-intensive handling, is provided, which in industrial manufacture can mean a significant simplification and therefore a considerable cost saving.

In one preferred embodiment of the present disclosure, in the cell module (10) the insulation (12) and the cell module housing (14) is formed as a monobloc using an encapsulation compound or an injection molding material.

By virtue of the formation as a monobloc using an encapsulation compound or using an injection molding material, all-round insulation of the cells with respect to one another is provided. In this way, the elaborate and expensive coating process as well as the films can furthermore be obviated. The use of an encapsulation compound or an injection molding material has the further advantage that it is possible in this way to compensate for manufacturing or mounting tolerances of the cells. This can lead to advantageous simplified further processing of the cells after the casting.

In particular, polyurethane and epoxy resins are suitable as an encapsulation compound. Both are favorably and rapidly commercially available, have properties favorable for the encapsulation and are particularly favorable for the purposes of the present disclosure in respect of their further properties such as durability, shock resistance, thermal behavior and insulation behavior. It is therefore preferred for a polyurethane or an epoxy resin to be provided as the encapsulation compound in the scope of the present disclosure. Furthermore, the desired strength can be adjusted through the selection of the encapsulation compound, so that it is possible to achieve both damping in the event of shock, for example by striking or impact, damping in the event of vibrations occurring during operation in a system, a machine or a vehicle, and therefore a cell which is less sensitive during operation. The use of an encapsulation material has the further advantage that it can compensate for manufacturing and/or mounting tolerances, which leads to simpler further processing of the cells after the casting.

The cell module housing (14) of the cell module according to the disclosure preferably comprises at least one side wall (14a) and a housing bottom (14b). Particularly preferably, the housing bottom (14b) has a contour for receiving cooling tubes (16). In this case, it is preferred for the housing bottom (14b) to be formed from a thermally conductive material. In this way, a possibility of effective cooling of the cells is obtained. The use of an additional cooling plate, which is associated with further costs and further thermal transfer coefficients between different materials, is therefore avoided. Furthermore, the risk of leaks of the cooling plate occurring are minimized.

In another preferred embodiment of the cell module according to the disclosure, operating electronics (17) are contained in the insulation and/or in the cell module housing (14). This has the advantage that the electronics and the jacks are mechanically protected against external influences such as moisture and/or particles.

Furthermore, it is advantageous for the encapsulation compound used according to the disclosure to contain an intumescent material. This is intended to mean a material system that foams at high temperatures and contains as components at least one binder, a gas-forming agent, a carbon source and optionally an acidic catalyst. For example, polyacrylates or polyolefins are suitable as a binder, glassy carbon or carbohydrates are suitable as a carbon source, flame-retardant substances such as triphenylphosphine or melamine are suitable as a gas-forming agents, and phosphates, sulfates, silicates or aluminates are suitable as acidic catalysts.

In addition, an intumescent material may also be used as a coating or coating additive for battery cells or further components of the cell module, or of the cell module housing.

In this way, spreading of a fire or the development of gaseous breakdown products inside the battery cells can be avoided, since a sealing effect of neighboring battery cells or cell module components is to be observed because of the foaming of the intumescent material and the associated volume increase thereof, and spreading of a fire can therefore be counteracted.

The present disclosure furthermore relates to a method for producing a cell module (10), comprising the steps:

providing at least two lithium ion cells (11), in particular lithium ion accumulator cells, placing and positioning the cells in a casting mold (20), filling the casting mold (20) with an encapsulation compound or an injection molding material, and curing the encapsulation compound for one-piece formation of an electrical insulation (12) between the cells (11) and a cell module housing (14) comprising at least one side wall (14a).

Preferably, the positioning of the cells (11) with respect to one another and in the casting mold (20) may be carried out by applying spacers (15). In this way, the positioning of the cells can be carried out flexibly, efficiently and at the same time precisely enough, which is particularly advantageous for use of the method according to the disclosure on an industrial scale. In this case, the spacers may be arranged, and jointly encapsulated firmly, at any height, for example at the height of the middle of the side wall, i.e. approximately half-way up from the bottom of the cell module housing (14b). Preferably, the spacers may be made of the same material as the encapsulation material. This constitutes an efficient method for producing the cell. The spacers (15) may, however, also be fitted onto the upper side of the cell (10) in such a way that they establish the distance of the lithium ion cells (11) both from one another and from the side walls (14a). In this case, it is preferred to configure the spacers (15) in such a way that they can be removed again from the finished cell module (10) after the casting process. They can therefore be reused for at least one more casting process. In this way, additional costs can be saved. Furthermore, a standardized distance of the lithium ion cells (11) from one another and from the cell module housing (14) can be achieved reproducibly in the production method by the use of spacers (15)—equally well whether casted firmly or fitted on from above and removably.

In another preferred embodiment of the method according to the disclosure, the module housing is manufactured in one piece by casting methods such as in particular sand casting, die casting, extrusion with a base plate welded on, or by float forming. In this way, the module housing is manufactured economically, which can in turn reduce the total costs of the method. As an alternative thereto, it is preferred to connect the housing made of plate material by connecting parts, for example screws, before the cells are adjusted before the encapsulation.

In the method according to the disclosure, it is preferred for the cells to be adhesively bonded onto highly thermally conductive plates (18) before they are positioned on a cooling plate in the casting mold (20). In this way, effective thermal dissipation of the finished cells is achieved in an efficient way, so that high-performance cells can be provided.

In another preferred embodiment of the method according to the disclosure, a contour for receiving cooling tubes (16) is provided in the bottom region before the cells are placed in the casting mold (20), and the cooling tubes (16) are introduced before filling with the encapsulation compound or the injection molding material. The contour for receiving cooling tubes (16) may, for example, be produced by milling. The cooling tubes (16) may for example consist of plastic, copper or aluminum. It is, however, particularly preferred that the contour for receiving cooling tubes (16) is already provided directly as a negative in the tool during casting or during float forming of the housing. The cooling tubes (16) can then be placed in the contour before the encapsulation. Subsequently, the cells may be provided with or adhesively bonded to the spacer insulators, and then everything may be encapsulated. This avoids the use of an additional cooling plate, which would otherwise be associated with further costs and thermal transfer coefficients between the corresponding components. Furthermore, the risk of leaks of the cooling plate is furthermore avoided by the encapsulation.

Preferably, operating electronics (17) or the housing of the operating electronics of the cell module are jointly encapsulated in the method according to the disclosure. In this way, the electronics and the jacks are protected against moisture and mechanical influences. Furthermore, good electrical insulation of the cells is generally achieved in this way.

BRIEF DESCRIPTION OF THE DRAWINGS

The present disclosure will be illustrated by way of example below with the aid of the following figures.

DETAILED DESCRIPTION

Figure 1:
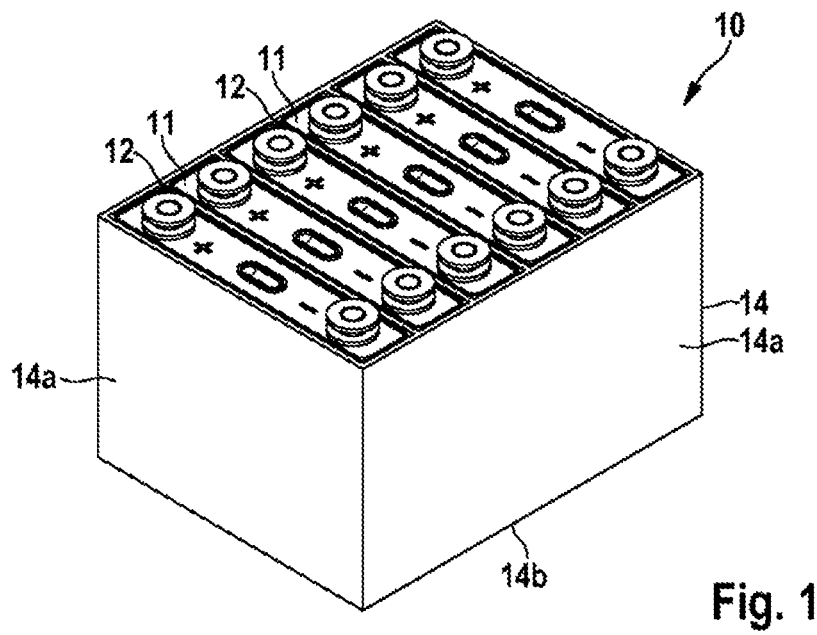
FIG. 1 is a perspective view of a cell module having a plurality of cells.

FIG. 1 shows a cell module (10) having a plurality of lithium ion cells (11), which may in particular be lithium ion accumulator cells. The cell module comprises at least one side wall (14a), as well as at least one electrical insulation (12) between the cells (11). As shown here, the insulation (12) is formed in one piece with the cell module housing (14). The cell module housing also has a housing bottom (14b).

Figure 2:
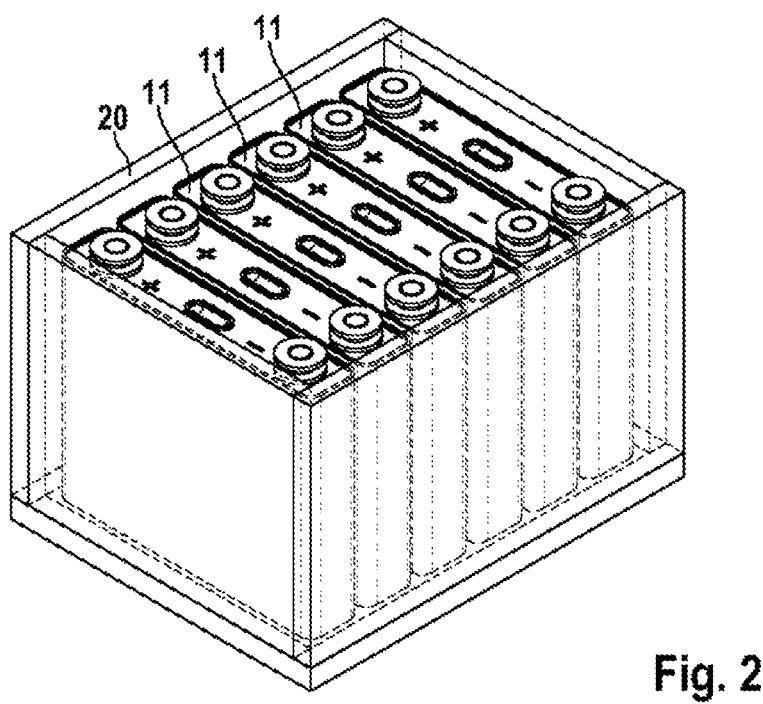
FIG. 2 is a perspective view of a plurality of cells at least partially encompassed by a casting mold.

FIG. 2 shows by way of example cells (11) in a casting mold (20). As can be seen here, this casting mold (20) is assembled using individual plates, which can be removed again and reused after encapsulation has been carried out.

Figure 3:
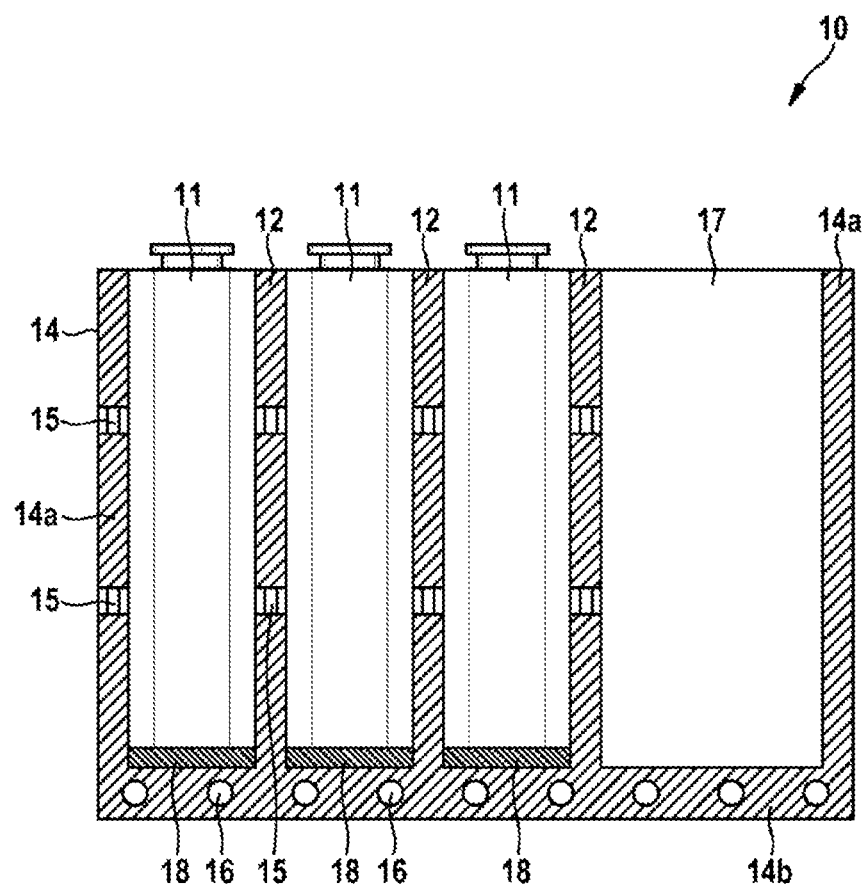
FIG. 3 is sectional view of a cell module with a plurality of cells separated by electrical insulations and operating electronics and disposed in a casting mold.

FIG. 3 shows, likewise by way of example, in a sectional drawing, a cell module (10) according to the disclosure according to a preferred embodiment of the present disclosure. The cell module (10) comprises a cell module housing (14) having side walls (14a) as well as a housing bottom (14b). This cell module housing (14) contains a plurality of lithium ion cells (11), which are for their part separated from one another by electrical insulations (12), as well as operating electronics (17). The positioning of the lithium ion cells (11) with respect to one another and in the casting mold ((20), not shown here) was carried out during the production process using spacers (15). The spacers (15) are shown here by way of example approximately at the height of the middle of the side wall (14a). They may, however, also be fitted onto the upper side of the cell (10) in such a way that they establish the distance of the lithium ion cells (11) both from one another and from the side walls (14a). The lithium ion cells (11) are placed on highly thermally conductive plates (18). The cell module housing bottom (14a) has a contour for receiving cooling tubes (16). In this way, good thermal dissipation from the lithium ion cells (11) out of the cell module housing (14) is ensured.

The invention claimed is:

1. A cell module for lithium ion batteries, comprising:
   at least two lithium ion cells;
   a cell module housing having at least one side wall;
   at least one electrical insulation disposed between the cells, the insulation configured in one piece with the cell module housing; and
   operating electronics contained in one or more of the insulation and the cell module housing.

2. The cell module as claimed in claim 1, wherein the insulation and the cell module housing are configured as a monobloc via an encapsulation compound or an injection molding material.

3. The cell module as claimed in claim 1, wherein the cell module housing has at least one side wall and a housing bottom.

4. The cell module as claimed in claim 3, wherein the housing bottom has a contour configured to receive cooling tubes.

5. The cell module as claimed in claim 3, wherein the housing bottom is configured from a thermally conductive material.

6. The cell module as claimed in claim 2, wherein the encapsulation compound includes a polyurethane or an epoxy resin.

7. The cell module as claimed in claim 2, wherein the encapsulation compound includes an intumescent material.

8. A method for producing a cell module, comprising:
   placing and positioning at least two lithium ion cells in a casting mold;
   filling the casting mold with an encapsulation compound or an injection molding material; and
   curing the encapsulation compound or the injection molding material in the casting mold for one-piece formation of an electrical insulation between the cells and a cell module housing having at least one side wall, wherein operating electronics or a housing of the operating electronics of the cell module are jointly encapsulated.

9. The method as claimed in claim 8, wherein the positioning of the cells with respect to one another and in the casting mold is carried out by applying spacers.

10. The method as claimed in claim 8, wherein the cells are adhesively bonded onto highly thermally conductive plates before the cells are positioned on a cooling plate in the casting mold.

11. The method as claimed in claim 8, wherein a contour configured to receive cooling tubes is provided in the bottom region before the cells are placed in the casting mold, and the cooling tubes are introduced before filling with the encapsulation material or the injection molding material.

12. The cell module as claimed in claim 1, wherein the at least two lithium ion cells are configured as lithium ion accumulator cells.

13. The method as claimed in claim 8, wherein the at least two lithium ion cells are configured as lithium ion accumulator cells.

14. The method as claimed in claim 8, wherein curing the encapsulation compound or the injection molding material further comprises:
   curing the encapsulation compound or the injection molding material with the at least two lithium ion cells at least partially immersed in the encapsulation compound or the injection molding material.

15. The method as claimed in claim 14, wherein curing the encapsulation compound or the injection molding material further comprises:
   curing the encapsulation compound or the injection molding material with at least one spacer positioned between at least two of the at least two lithium ion cells.

16. The cell module as claimed in claim 1, wherein the insulation is configured in one piece with the cell module housing and molded to each of the at least two lithium ion cells.

17. The cell module as claimed in claim 16, wherein the insulation is configured in one piece with the cell module housing and molded to at least one spacer positioned between at least two of the at least two lithium ion cells.

* * * * *